United States Patent [19]

Kondo

[11] 4,213,196

[45] Jul. 15, 1980

[54] ULTRASONIC TYPE MOTION DETECTOR

[75] Inventor: Mikio Kondo, Tsu, Japan

[73] Assignee: Matsushita Electric Works, Ltd., Osaka, Japan

[21] Appl. No.: 879,593

[22] Filed: Feb. 21, 1978

[51] Int. Cl.$^2$ ............................................. G01D 21/04
[52] U.S. Cl. ..................................................... 367/94
[58] Field of Search ............... 340/552, 553, 554, 558, 340/559, 560, 565, 566, 567, 3 D; 343/5 PD, 7.7

[56] References Cited

U.S. PATENT DOCUMENTS

| | | | |
|---|---|---|---|
| 3,665,443 | 5/1972 | Galvin .................................... | 340/560 |
| 3,760,400 | 9/1973 | Galvin et al. ......................... | 340/554 |
| 3,905,033 | 9/1975 | Moore et al. ......................... | 343/7.7 |
| 4,023,156 | 5/1977 | Galvin .................................... | 340/559 |

Primary Examiner—John C. Martin
Assistant Examiner—Joseph A. Orsino, Jr.
Attorney, Agent, or Firm—Burns, Doane, Swecker & Mathis

[57] ABSTRACT

Ultrasonic type motion detector which highly reliably detects presence of moving object without being misoperated by any other physical phenomena in detecting area. Respective frequency levels of transmitted and received wave signals are detected by a detecting section of a quadrature detecting circuit and phase difference detecting circuit, one of the level-detected signals is inverted and combined with the other, both signals are connected through an integrating circuit to a standard voltage source, and a pair of comparators are connected to the standard voltage source in parallel to each other so that an output signal indicative of the presence of object to be detected will be provided in either case when ouptut voltage of the standard voltage source becomes high or low.

4 Claims, 31 Drawing Figures

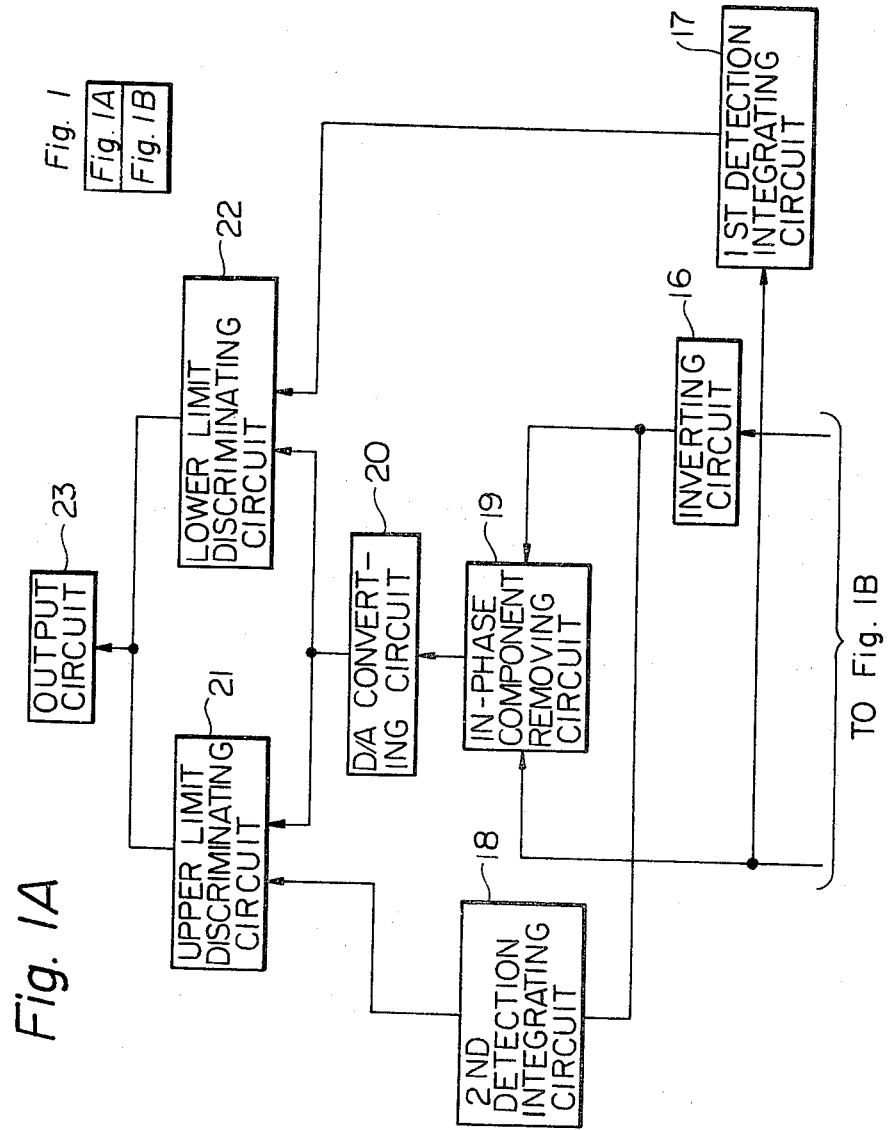

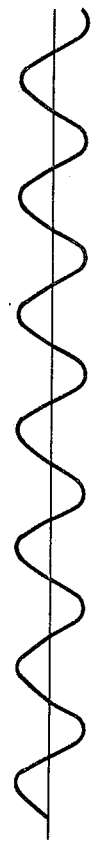
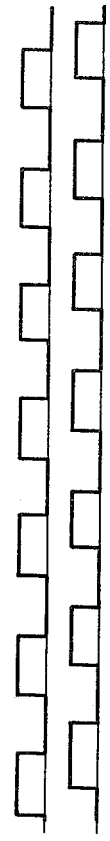
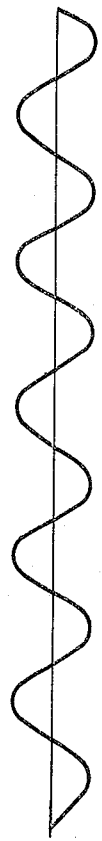
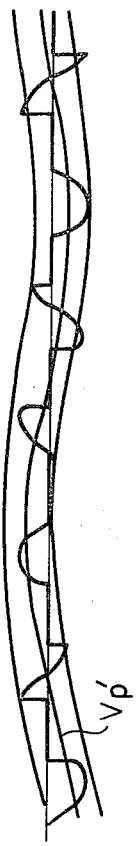
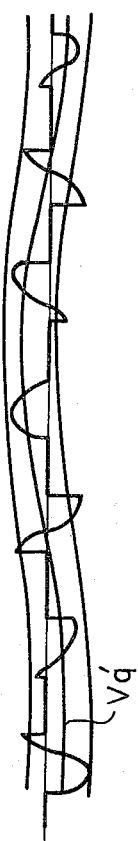
Fig. 9A  Fig. 9B  Fig. 9C  Fig. 9D  Fig. 9E  Fig. 9F

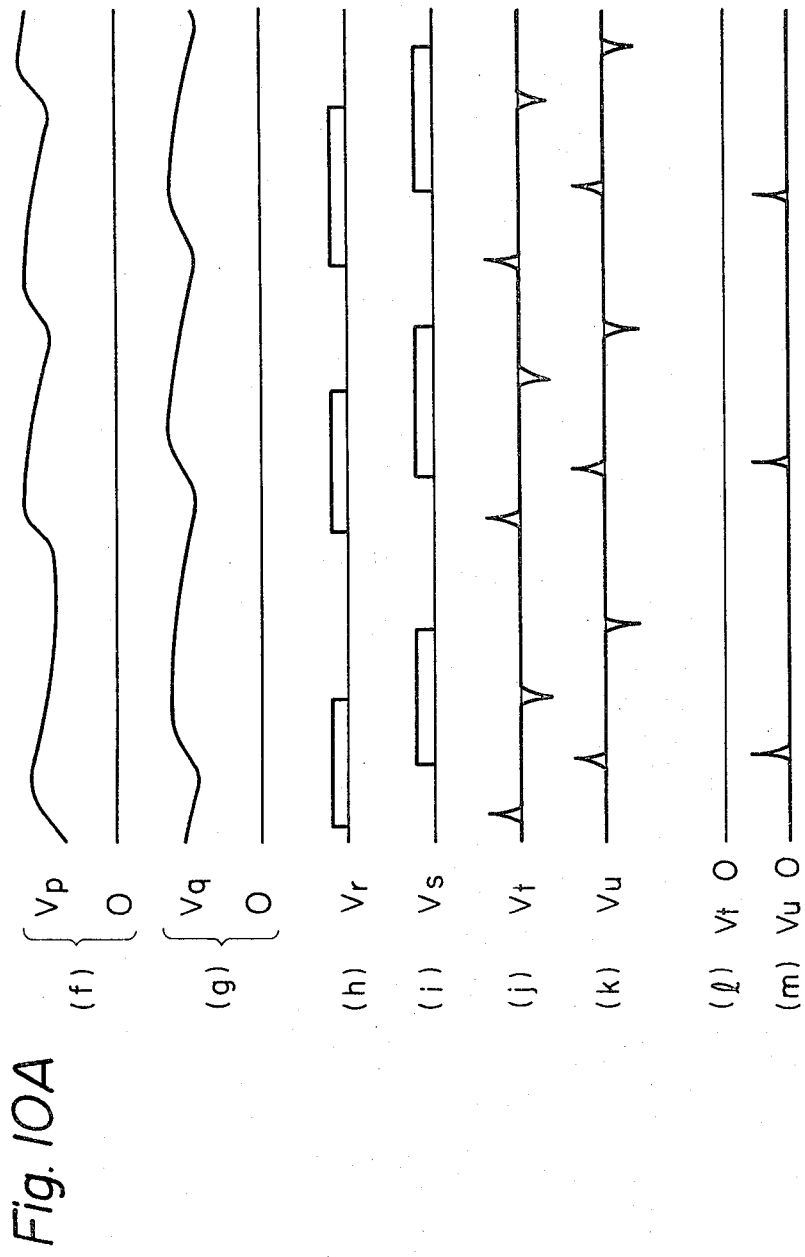

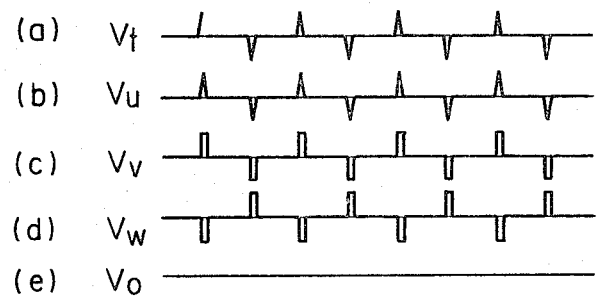
Fig. 13
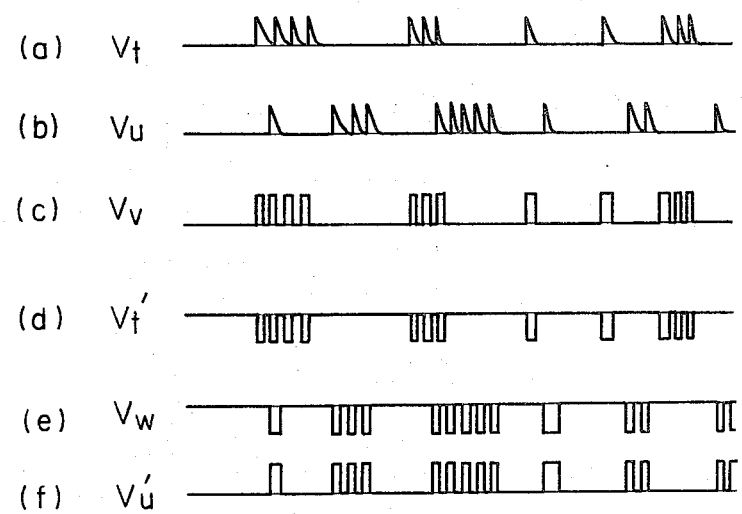
Fig. 14
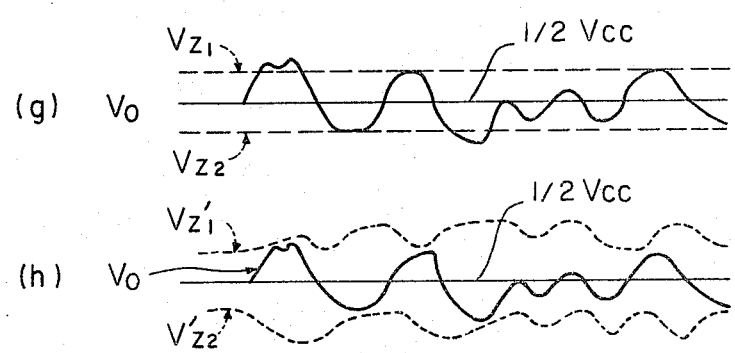

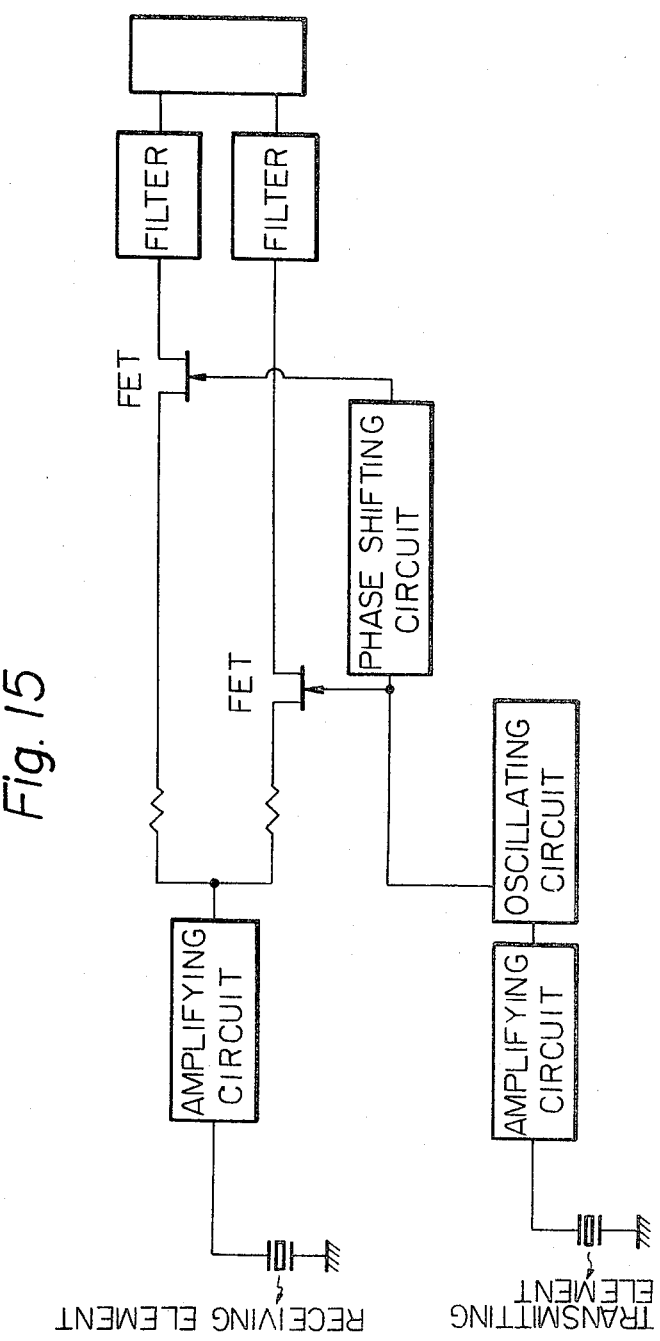

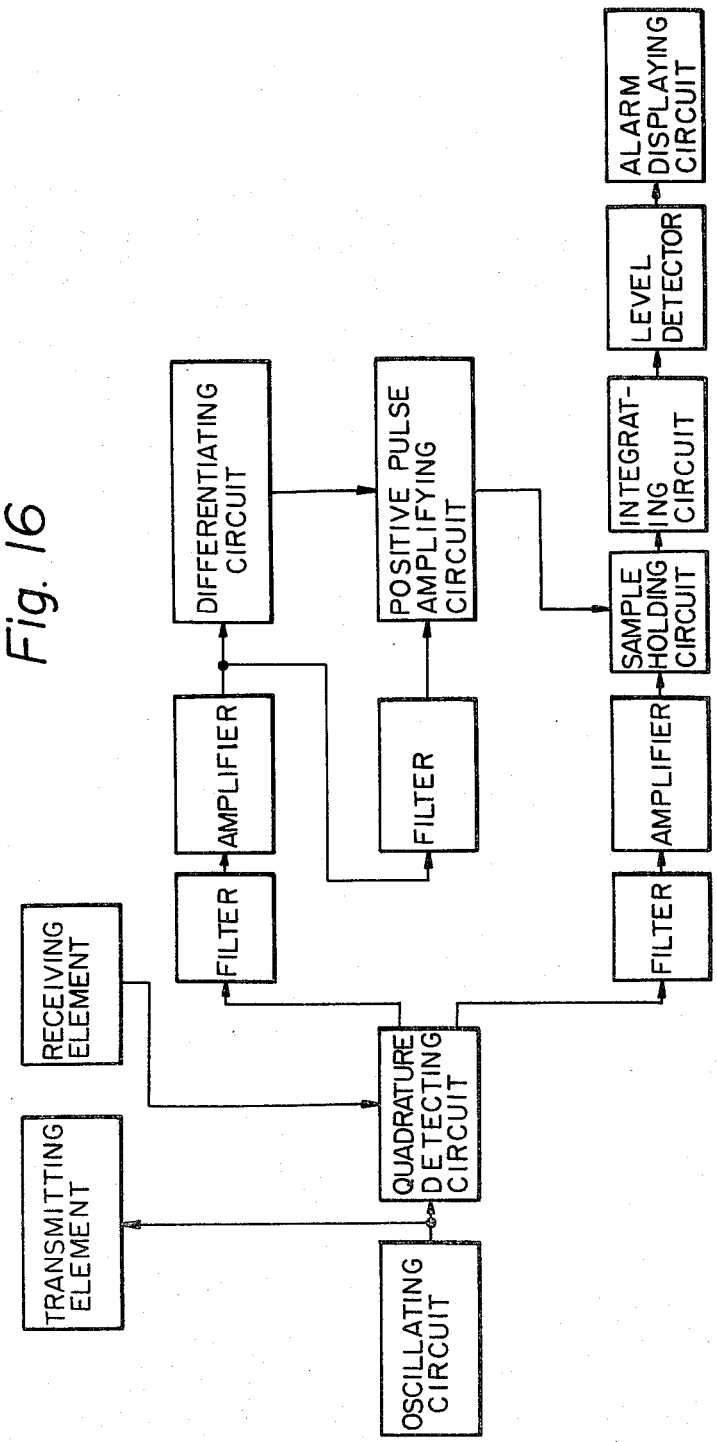

ULTRASONIC TYPE MOTION DETECTOR

This invention relates to ultrasonic type motion detectors and, more particularly, to improvements in ultrasonic type motion detectors utilizing Doppler effect.

Ultrasonic type watching devices of the kind referred have been well known, and the one which is generally appreciated to be on the highest technical level today is disclosed in the U.S. Pat. No. 3,665,443 granted to Galvin in May, 1972.

The watching device disclosed in this patent is devised to generate no mis-warning due to any turbulence of air caused by movements of curtain, variations in ambient temperature, influences of air-conditioner and the like, but is defective in that the detection is not accurate enough against such very large air turbulence as is caused by a bell or any air turbulence different from the one caused by the movements of curtain or the flow of air, that many complicated circuits are required, and that required cost is high. The present invention has been suggested to remove these defects.

A primary object of the present invention is to provide an ultrasonic type motion detector which is highly reliable in detecting sensitivity to human movements and is low in the probability of mis-operations by physical phenomena other than the human movements.

Another object of the present invention is to provide an ultrasonic type motion detector which is simple in structure, low in cost and easy to manufacture.

Other objects and advantages of the present invention shall be made clear upon reading the following descriptions of the invention detailed with reference to accompanying drawings, in which:

FIGS. 1A and 1B show as combined a block diagram of an embodiment of the detecting device of according to the present invention;

FIGS. 9A through 9F are wave form diagrams of transmitted and received wave signals and quadrature detecting outputs in the present invention;

FIGS. 10A and 10B show signal wave forms at respective parts of the device of FIG. 1;

FIG. 13 shows signal wave forms at certain parts of the detector of the present invention in case wave components are present on both side wave bands substantially equally in the received wave signals;

FIG. 14 shows wave forms for explaining control operation of limit detecting voltages of upper and lower limit discriminating circuits in the present invention;

FIG. 15 shows a conventional quadrature detecting circuit in a block diagram;

FIG. 16 is a block diagram of a conventional ultrasonic type motion detector.

Figure 1B:
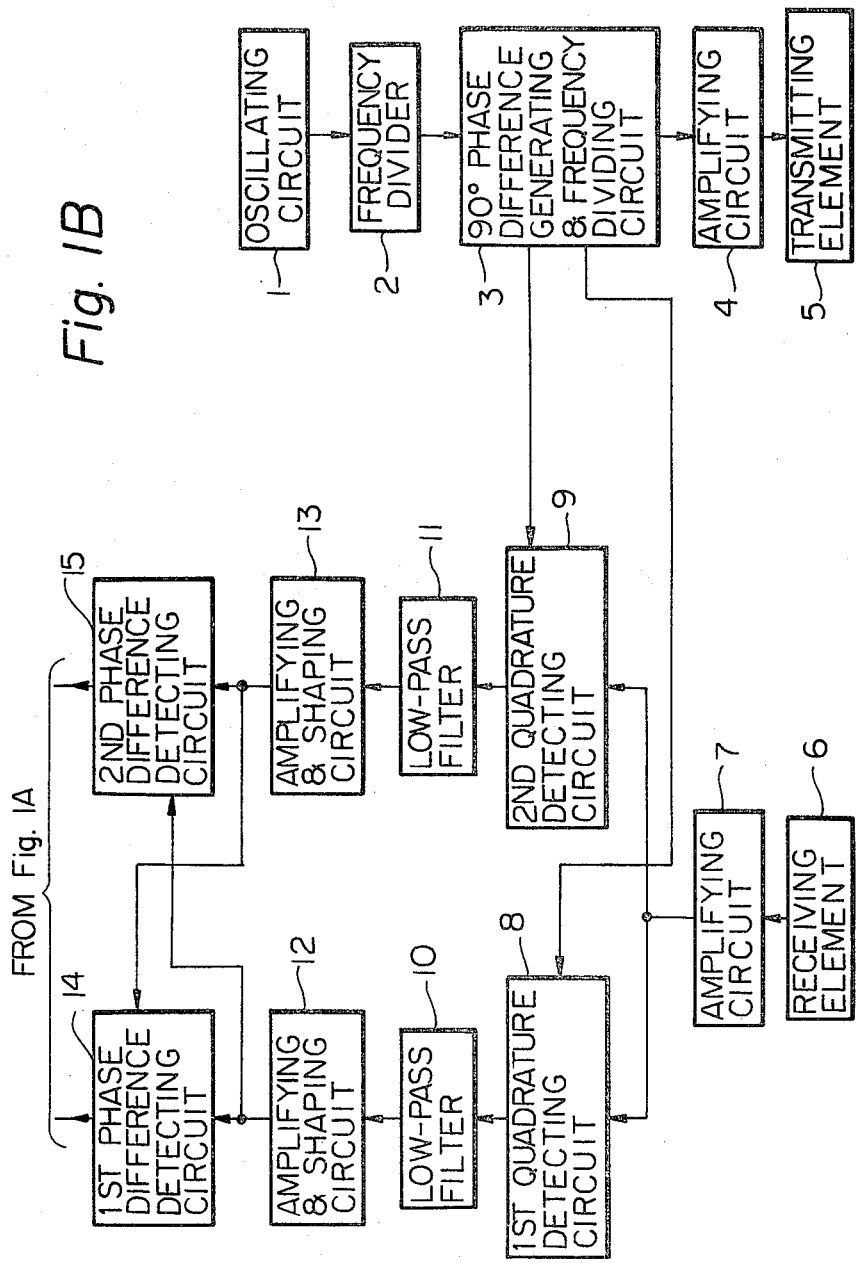

Referring to an embodiment of the present invention shown in the block diagram of FIGS. 1A and 1B, 1 is a oscillating circuit of such high frequency as, for example, 100 KHz. The output of this oscillating circuit 1 is given to a ½ frequency divider 2. The output of this ½ frequency divider 2 is given to a 90° phase difference generating and frequency dividing circuit 3 comprising flip-flops Ic$_{4-1}$ and Ic$_{4-2}$. The signal from the ½ frequency divider 2 is further ½ frequency-divided by this frequency dividing circuit 3 so as to be a signal of about 25 KHz.

The output from the frequency dividing circuit 3 is amplified by an amplifying circuit 4 and transmitted outward as an ultrasonic wave by a transmitting element 5.

Any reflected back ultrasonic wave is received by a receiving element 6 and is amplified by an amplifying circuit 7. The output from the amplifying circuit 7 is given to respective first and second quadrature detecting circuits 8 and 9. In the respective detecting circuits 8 and 9, outputs corresponding to the received wave signals will be obtained, only when there are Q output signals of the flip-flops Ic$_{4-1}$ and Ic$_{4-2}$ connected respectively through diodes D$_1$ and D$_2$.

The outputs of the respective first and second quadrature detecting circuits 8 and 9 are given to first and second phase difference detecting circuits 14 and 15 respectively through low-pass filters 10 and 11 for converting them to average level signals and further through amplifying and shaping circuits 12 and 13 which shape the wave forms of the outputs of the phase difference detecting circuits 14 and 15. In said phase difference detecting circuits 14 and 15, a differential signal will be obtained on either side of their outputs when the other output is on the "H" level depending on the outputs of the amplifying and shaping circuits 12 and 13.

The output from the first phase difference detecting circuit 14 is given to an in-phase component removing circuit 19 and the output from the second phase difference detecting circuit 15 is also given to this circuit 19 through an inverting circuit 16. The in-phase component removing circuit 19 couples the first and second phase difference detecting circuits 14 and 15 to a later described D/A converting circuit 20 through diodes Dz$_1$ and Dz$_2$, and the output of the D/A converting circuit 20 is varied in response to the states of the outputs of the first and second phase difference detecting circuits 14 and 15.

The output from the in-phase component removing circuit 19 is given to the D/A converting circuit 20, which is a circuit for converting an input digital signal to an analogue signal. Further, the output from the first phase difference detecting circuit 14 is given to a first detection integrating circuit 17. The output from this circuit 17 is given to a lower limit discriminating circuit 22. In the integrating circuit 17, the output of the first phase difference detecting circuit 14 is inverted and applied to a voltage setting capacitor $C_1$ connected to a comparator $Ic_{1-4}$ of the lower limit discriminating circuit 22. A lower side detecting limit voltage of the comparator $IC_{1-4}$ is made controllable so as to become lower by means of the voltage on the output side of the upper side wave band. In the lower limit discriminating circuit 22, the output of the D/A converting circuit 20 is fixed or is compared with the lower side detecting limit voltage controlled by the first detection integrating circuit 17 to provide an output.

The output from the second phase difference detecting circuit 15 is given to the second detection integrating circuit 18 and the output from this circuit 18 is given to the upper limit discriminating circuit 21. In the second detection integrating circuit 18, under the same principle as of the operation in the above described first detection integrating circuit 17, the upper side detecting limit voltage of the comparator $Ic_{1-4}$ is made controllable to be higher with the voltage on the output side of the upper side wave band. In the upper limit discriminating circuit 21, the output of the D/A converting circuit 20 is fixed or is compared with the upper side detecting limit voltage controlled by the detection integrating circuit 18 to provide an output. The outputs of the upper limit discriminating circuit 21 and lower limit discriminating circuit 22 are given to an output circuit 23.

Referring briefly to a practical circuit arrangement based on the above described block diagram, the same reference numerals are given respectively to the parts which performs the same operation as the respective blocks shown in FIG. 1, and details of this embodiment shall be omitted here.

The operating principle of the present invention shall now be explained in the following.

Figure 3A:
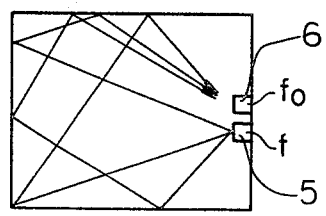
FIGS. 3A and 3B are respectively an explanatory view showing an ultrasonic wave transmitting and receiving state and a frequency spectrum diagram of received wave signals in case no moving object is present.
Figure 3B:
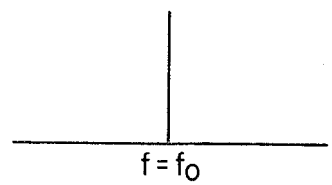
Figure 4A:
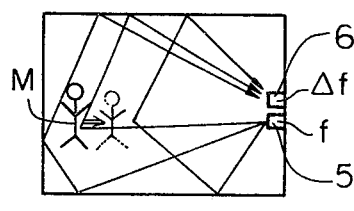
FIGS. 4A and 4B are respectively an explanatory view showing an ultrasonic wave transmitting and receiving state and a frequency spectrum diagram of received wave signals in case a moving object is present.
Figure 4B:
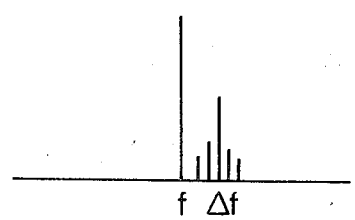
Figure 5A:
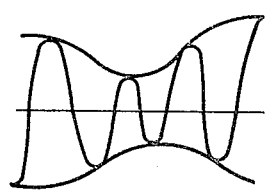
FIGS. 5A and 5B are respectively a wave form diagram showing a combined state of ultrasonic waves received through different paths and their frequency spectrum diagram.
Figure 5B:
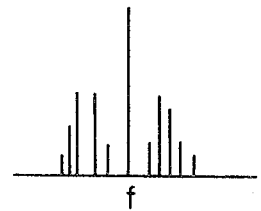
Figure 6:
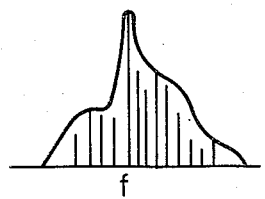
FIG. 6 is an actual frequency spectrum diagram in case a moving object is present.

When there is no change within a watching zone in which ultrasonic waves are radiated from the transmitting element 5 as shown in FIG. 3A, the frequency $f_o$ of received ultrasonic waves will coincide with the frequency f of the radiated ultrasonic waves and a signal of a single frequency $f = f_o$ having no side wave band as shown in FIG. 3B will be received by the receiving element 6. When such moving object M as a human object is present within the watching zone as shown in FIG. 4A, representing a Doppler frequency by $\Delta f$, a sound velocity of the ultrasonic waves by c, a velocity of the moving object M by v and a radiated ultrasonic wave frequency by f, the relation of $\Delta f = 2vf/c$ will hold. The value will be either positive or negative depending on the moving direction of the moving object M and will be included as a side wave band in the received wave signal. As shown in FIG. 4B, when the moving object M approaches, the upper side wave band component will be produced but, when the moving object leaves away, the lower side wave band component will be produced. Thus, a received wave signal will be obtained as a single side wave band (SSB) so called in the communication system. However, as the ultrasonic waves radiated in the space are received generally by the receiving element 6 as combined waves of sound waves reflected by various parts within the radiating zone, in case an object having a movement not required to be detected is present within the watching zone or in case air moves, the ultrasonic wave signal from each of the above referred paths will vary in the phase and amplitude and the combined signal will vary as shown in FIG. 5A to be of double side wave band waves (DSB waves) distributed on both upper and lower sides as shown in FIG. 5B. Therefore, when a moving object M is present within the watching zone, the received wave signal will have such resultant spectrum as shown in FIG. 6 obtained by combining the waves of FIGS. 3B, 4B and 5B.

Figure 7A:
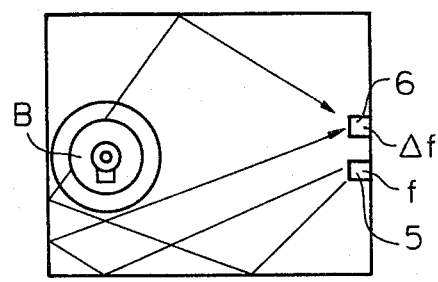
FIGS. 7A and 7B are respectively an explanatory view showing an ultrasonic wave transmitting and receiving state and a wave form diagram of a received wave signal in case sounds of a bell or the like are generated.
Figure 7B:
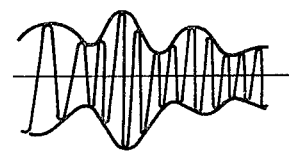

Thus, in order to perform the detection of the moving object M, it will be evident from the above explanation that the detecting operation should preferably be made in the event when the distribution of the two upper and lower side wave bands is nonuniform. Therefore, in order to take out the respective upper and lower side wave bands, there are provided the first and second quadrature detecting circuits 8 and 9, low-pass filters 10 and 11, amplifying and shaping circuits 12 and 13 and first and second phase difference detecting circuits 14 and 15 in the block diagram shown in FIG. 1. However, while the first and second quadrature detecting circuits 8 and 9 enable it possible to take out a signal in case of an input of a single side wave band, the amplifying and shaping circuits 12 and 13 will be in-phase in the case of DSB waves in which both side wave bands are present in the input. This in-phase component is unnecessary for detecting the moving object M. Further, such sounds which are strong in the generated sound waves as the sounds of the bell B will disturb the ambient air acting as a medium of the ultrasonic waves, as shown in FIG. 7A, and will produce strong DSB signals in the received signals, as shown in FIG. 7B, and it is necessary to cut such DSB signals. In such case, an opposite phase separation of received wave signals can be performed since the phase difference detecting circuits 14 and 15 do not produce any output when one of the amplifying and shaping circuits 12 and 13 is of "H" level output, but the removal of the in-phase component will not be able to be made. Thus, the removal of this in-phase component will be made possible by causing the signals entering both ends of the in-phase component removing circuit 19 to cancel each other so that the input signals to the D/A converting circuit 20 will be invariable. This is because, as will be described later, even if both outputs of the phase difference detecting circuits 14 and 15 are generated simultaneously, the non-inverted output and inverted output will be voltage-divided by resistances so that their signals will be cancelled with each other and the reference voltage of the D/A converting circuit 20 will keep ½ Vcc.

Figure 8A:
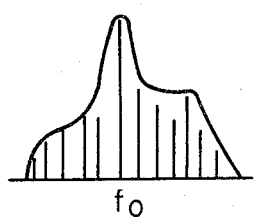
FIGS. 8A and 8B are respectively frequency spectrum diagrams of random spectra by bell sounds or the like at respectively different times.
Figure 8B:
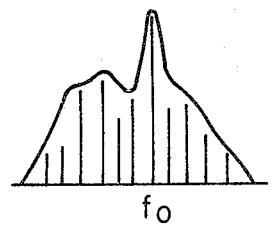

On the other hand, the spectrum of the sounds of the bell will be distributed not only to the audible frequency wave band but also to the ultrasonic wave band, and this distributed state will not be always constant so that, at one moment, it will be such spectrum-distribution as shown in FIG. 8A but, at another moment, it will be as in FIG. 8B. Thus, a very random spectrum distribution varying momentarily is provided. The spectrum for the transmitted wave signals is to be of a side wave band distributed at random above and below. If this random distribution is well balanced above and below, there will be no problem but, if this spectrum distribution is unbalanced on the average, there is performed a detecting operation in the detector circuit. According to the present invention, therefore, an observation has been made that, when the movement in one direction of the human object continues for a fixed time, the received wave signal due to the movement of the human object will be a signal of the upper or lower side wave band continuing for a fixed time but the ultrasonic wave component included in the sounds of the bell or the like will produce side wave bands at random above and below, and any occurrence of a mis-operation by the bell sounds or the like has been successfully prevented by having an operation performed such that, in the above described case, the detecting limit level is cancelled in response to the level of the side wave band on the other side.

Operations of the respective parts in the detector of the present invention shall be referred to in the followings.

Figure 2A:
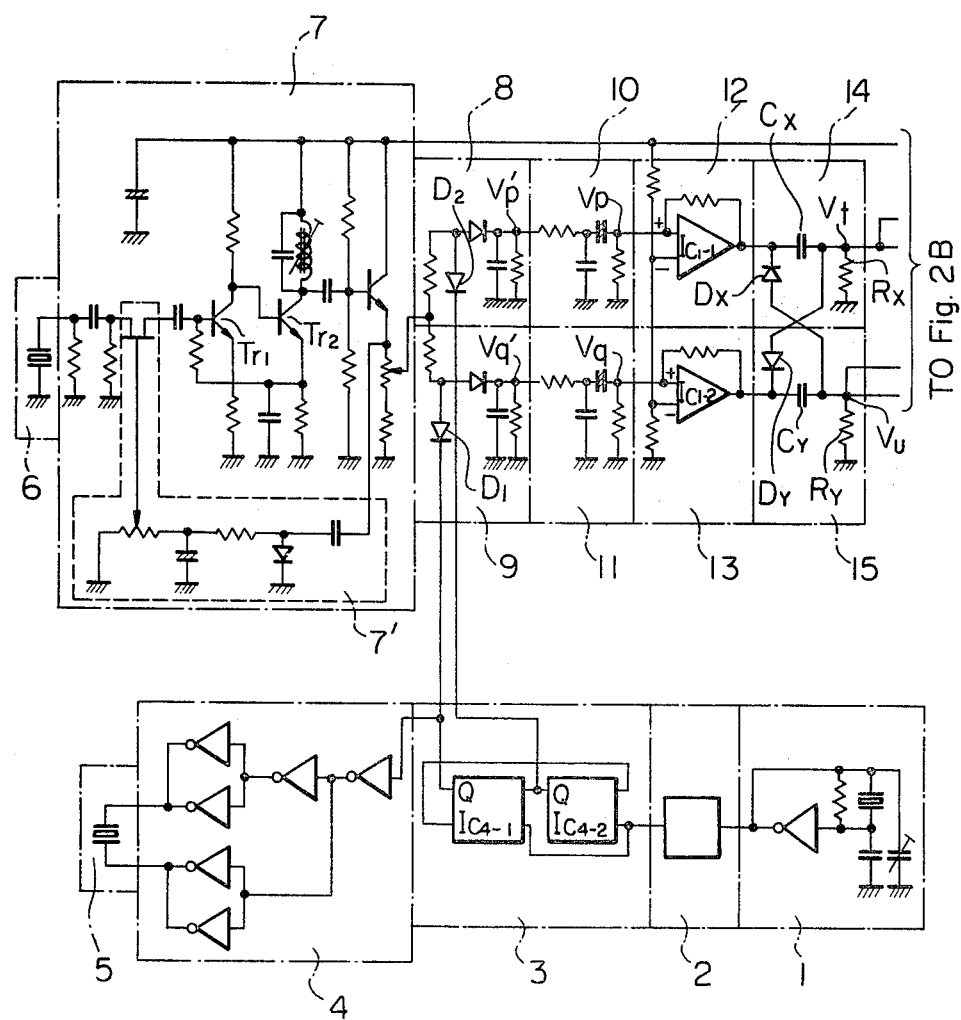
FIGS. 2A and 2B show as combined a circuit of a practical embodiment of the detecting device according to the present invention.
Figure 2B:
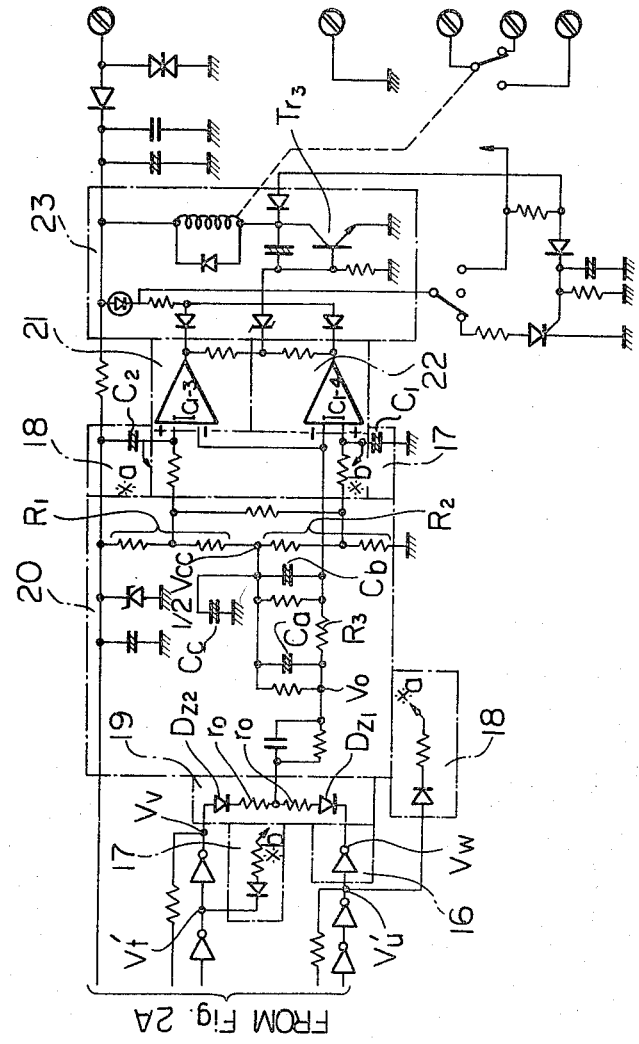

In FIGS. 1 and 2, a square wave signal of, for example, about 100 KHz is generated by the oscillating circuit 1 and the generated signal is frequency-divided to be of 26300 Hz by the frequency-dividing circuits 2 and 3 and amplified by the amplifying circuit 4, the transmitting element 5 will be vibrated to transmit ultrasonic waves in air and the ultrasonic waves reflected back will be received by the receiving element 6 and converted to an electric signal which will be amplified by the amplifying circuit 7. In such case, only a frequency zone tuned with an LC resonating circuit connected to the collector of a transistor $Tr_2$ will be selected and amplified. An automatic gain controlling circuit 7' is provided in the amplifying circuit 7.

Now, FIGS. 9A through 9F show respective wave forms of outputs of flip-flops of the 90° phase difference generating and frequency dividing circuit 3 and quadrature outputs of transmitted and received wave signals. FIG. 9A shows a transmitted wave signal, and FIG. 9D shows a received wave signal. The operation of the quadrature detecting circuits shall be explained with reference to the wave forms of FIGS. 9A to 9F. In the first quadrature detecting circuit 8, as shown in FIG. 9B, the diode is switched by the "Q" output f' of $Ic_{4-2}$ of the frequency dividing circuit 3 and, in the second quadrature detecting circuit 9, as in FIG. 9C the diode is switched by the "Q" output f of $Ic_{4-1}$ of the frequency dividing circuit 3 and such outputs respectively as in FIGS. 9E and 9F are provided. That is, only while the "Q" outputs of $Ic_{4-1}$ and $Ic_{4-2}$ are on the "H" level, the received wave signal will be taken out respectively as the outputs of the quadrature detecting circuits 8 and 9. Therefore, for the outputs of the quadrature detecting circuits 8 and 9, there are obtained the signals shown in FIGS. 9E and 9F.

Figure 10B:
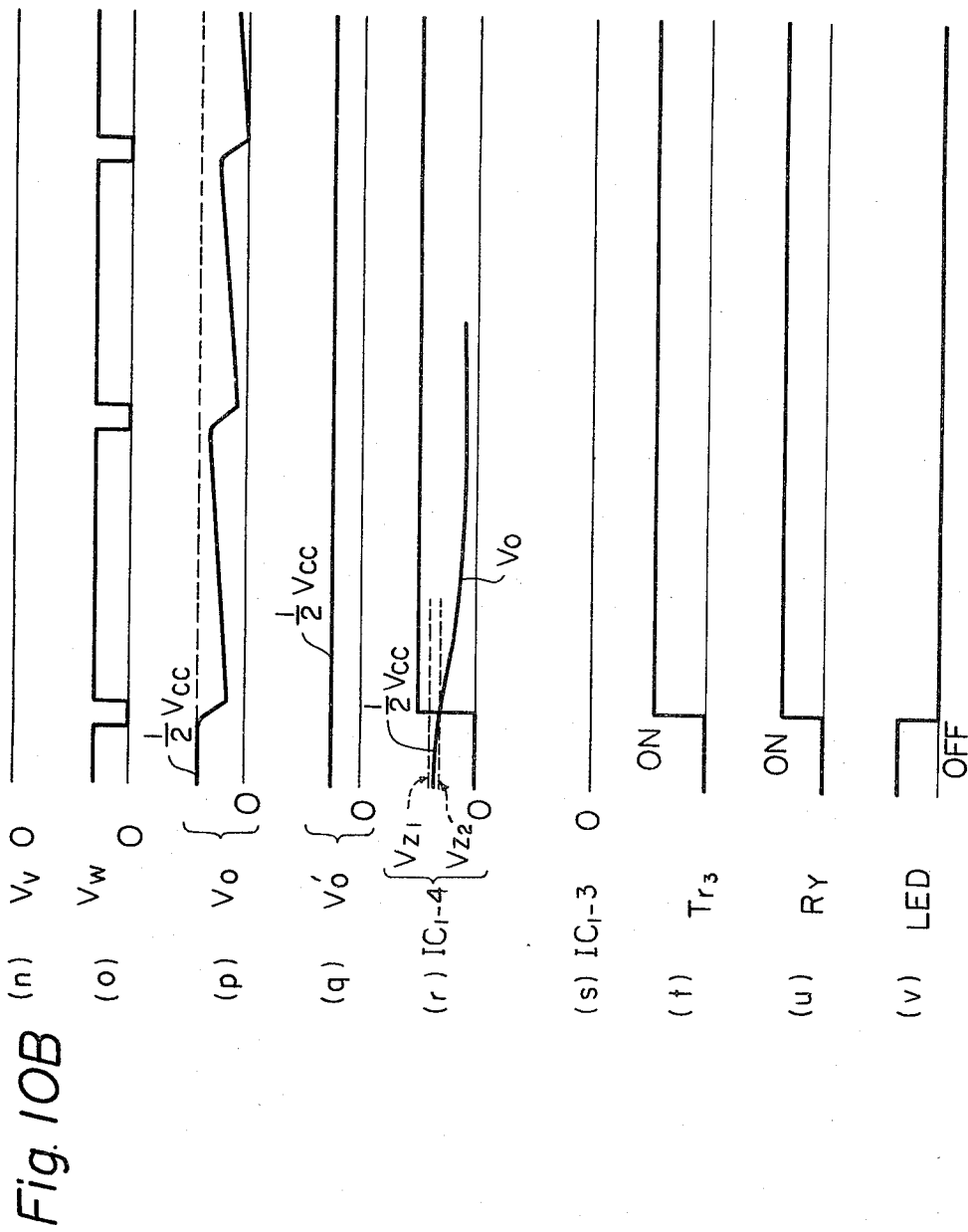

FIG. 10 shows wave forms of the respective parts in the detector of the present invention in case the object to be detected leaves away. When the outputs of the quadrature detecting circuits 8 and 9 are added to the low-pass filters 10 and 11, the outputs $V_p$ and $V_q$ will be as shown in (f) and (g) in FIG. 10. When these outputs are given respectively to the non-inverted amplifiers $Ic_{1-1}$ and $Ic_{1-2}$ of the amplifying and shaping circuits 12 and 13, such outputs as in (h) and (i) in FIG. 10 will be obtained. These outputs are given respectively to the phase difference detecting circuits 14 and 15. In case the diodes Dx and Dy are not present in said phase difference detecting circuit, the input signals will be differen-
tiated by the capacitors Cx and Cy and signals of such wave forms as in (j) and (k) of FIG. 10 will be obtained. In practice, however, the diodes Dx and Dy are present so that, as in (l) and (m) in FIG. 10, pulses will be generated only in the voltage Vu. This voltage is impressed on the in-phase component removing circuit 19 and D/A converting circuit 20 but, as the voltage Vt is in-phase with the voltage Vv and the voltage Vw has inverted the voltage Vu, the voltages Vv and Vw will be as in (n) and (o) of FIG. 10. As the voltage Vo corresponds to a voltage $\frac{1}{2}$ Vcc divided by the resistances $R_1$ and $R_2$ but the diode $Dz_2$ is of a reverse polarity, it will be able to give no influence on the voltage Vo when the voltage Vw is on the "H" level but, only when Vw is on the "L" level, it will act to reduce the voltage Vo. The voltage Vo will be smoothed by the capacitor Cc so as to be of such wave form as in (p) in FIG. 10. Now, in the upper and lower limit discriminating circuits 21 and 22, the reference voltages $Vz_1$ and $Vz_2$ of the comparators $Ic_{1-3}$ and $Ic_{1-4}$ are assumed to be $$Vz_2 < \tfrac{1}{2} Vcc < Vz_1.$$

When Vo is smaller than $Vo_2$, $Ic_{1-4}$ will be turned, $Ic_{1-3}$ will remain as it is, the transistor $Tr_3$ will be ON, the transistor $Tr_3$ will be ON and the relay Ry will be operated. The wave forms of $Ic_{1-4}$, $Ic_{1-3}$, $Tr_3$, Ry and LED are shown respectively in (r), (s), (t), (u) and (v) in FIG. 10.

Figure 11:
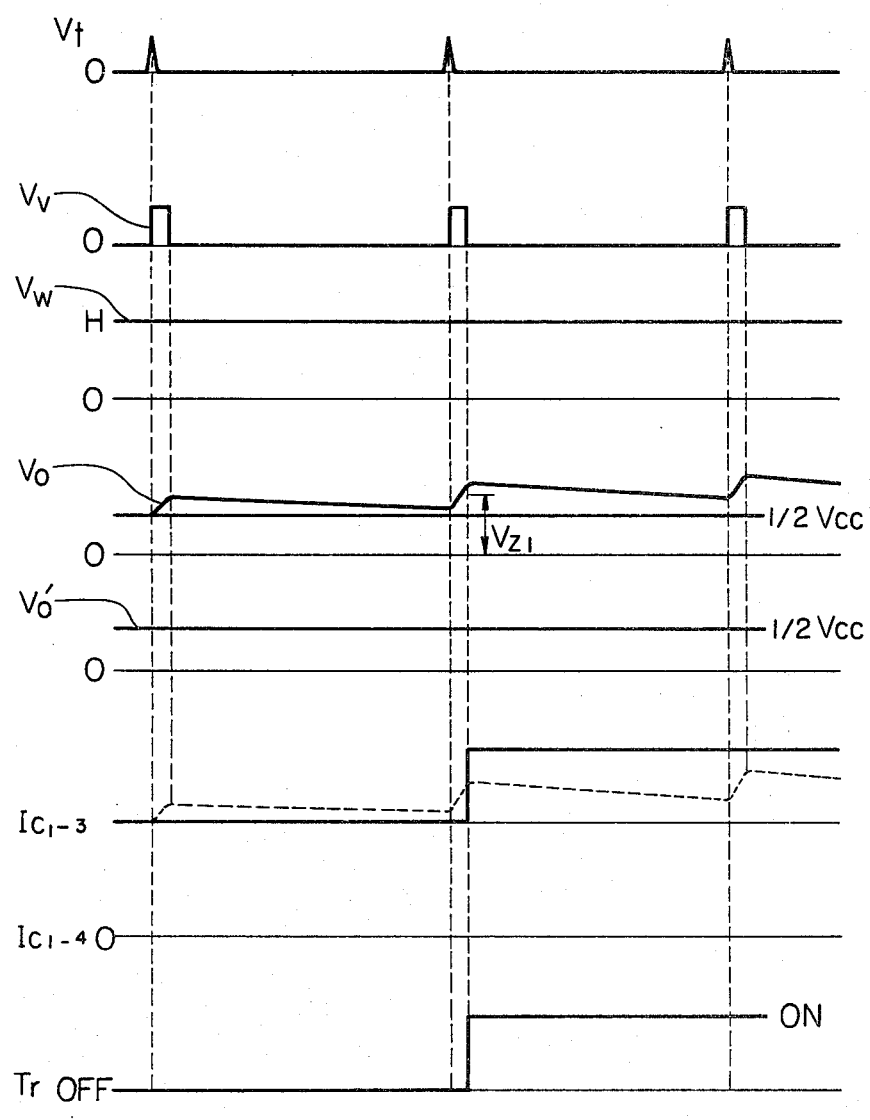
FIG. 11 shows signal wave forms at certain parts of the device of FIG. 1 in case an approaching object is present.

While the above described case in the one in which the received wave signal contains the lower side wave band component, that is, the moving object is moving in the direction of leaving the detector, wave forms in a case where the upper side wave band component is present in the received wave signal, that is, the moving object is approaching, will be respectively as shown in (a) to (g) in FIG. 11, and $Ic_{1-3}$ will be ON. The explanation of the operation of this shall be omitted.

Figure 12:
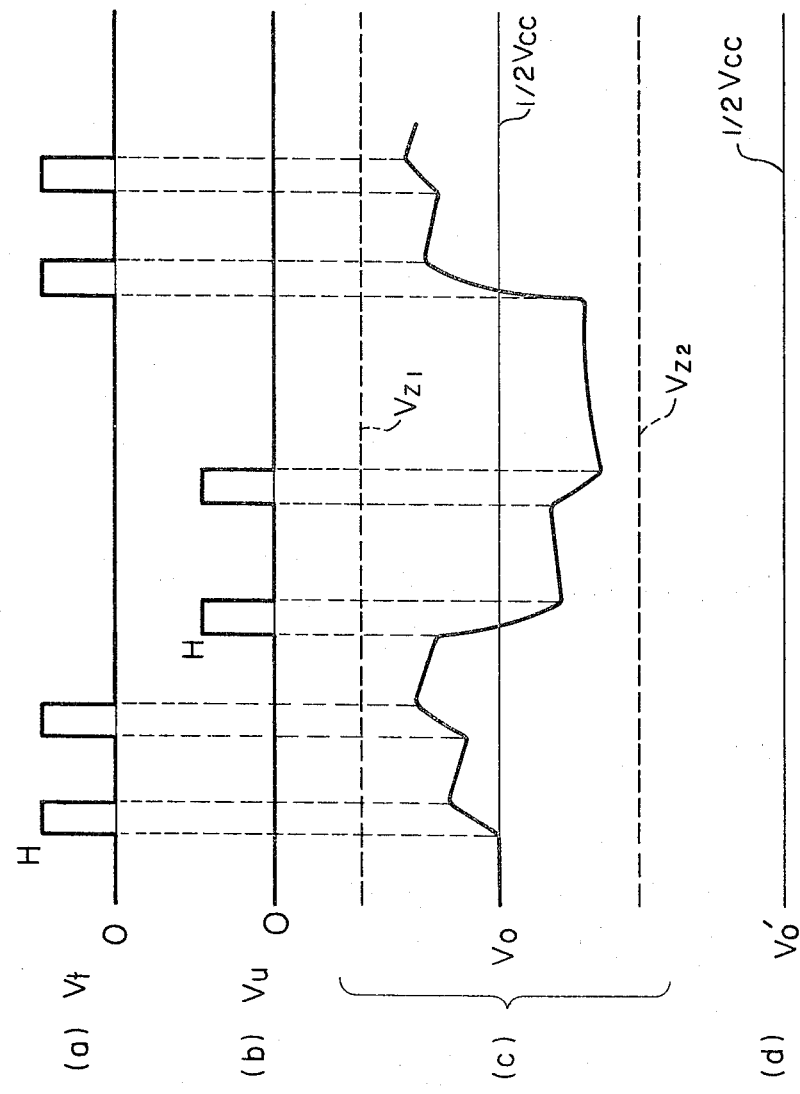
FIG. 12 shows signal wave forms also at certain parts in case a moving object approaching and separating the detector is present.
Figure 17A:
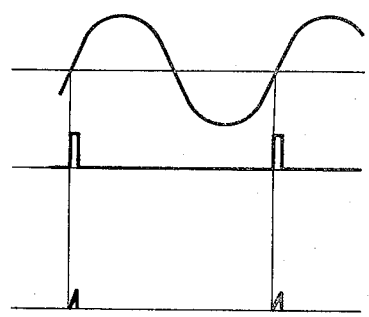
FIGS. 17A and 17B are explanatory wave form diagrams in a case of excessively large signals and detected quadrature outputs substantially of the same phase.
Figure 17B:
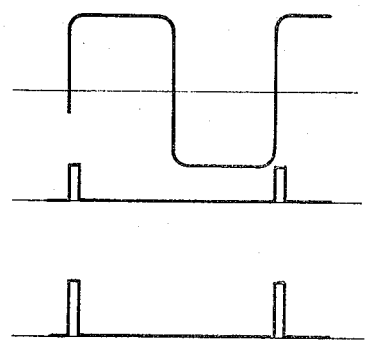

Next, in case the upper and lower side wave band components are alternately present in the received wave signal, that is, when the moving object is moving forward and rearward, as shown in (c) of FIG. 12, the voltage Vo will swing above and below within the range of $Vz_1$ and $Vz_2$ substantially on the basis of $\frac{1}{2}$ Vcc and, therefore, $Ic_{1-3}$ and $Ic_{1-4}$ will not be ON. Further, in case both side wave band components are present in the received wave signal substantially uniformly and only their levels fluctuate, that is, when such AM-like component as an air turbulence is present, Vv and Vw will be cancelled with each other and the voltage Vo will be $\frac{1}{2}$ Vcc as shown in (e) in FIG. 13. Therefore, if the outputs are separately provided by $Ic_{1-3}$ and $Ic_{1-4}$ as required, it is possible to discriminate whether the moving object leaves away or approaches.

Now, in case such Doppler frequency wave component as of bell sounds is irregularly generated as shown in (a) and (b) in FIG. 14, the voltages Vt, Vu, Vv, Vt', Vw, Vu' and Vo will be as shown in (a) to (g) in FIG. 14 and the outputs Vt and Vu of the phase difference detecting circuits 14 and 15 will be random and irregular as shown in (a) and (b) in FIG. 14 and, therefore, will not be cancelled with each other even by the in-phase component removing circuit 19. As shown in (g) in FIG. 14, the voltage Vo will exceed the detecting limit voltages $Vz_1$ and $Vz_2$ of the upper and lower limit discriminating circuit 21 and 22. Therefore, the comparators $Ic_{1-3}$ and $Ic_{1-4}$ will inverse at random and the relay Ry will be repeatedly made ON and OFF.

Therefore, according to the present invention, one of the outputs Vt and Vu of the phase difference detecting circuits 14 and 15 is inversed to be Vt' but, the other is not inversed and is made Vu', the first detection integrating circuit 17 in which the lower side detecting limit voltage $Vz_2$ of the lower limit discriminating comparator is controlled to be lower by the voltage Vt' on the output side of the upper side wave band is connected to the comparator $Ic_{1-4}$, the second detection integrating circuit 18 in which the upper side detecting limit voltage $Vz_1$ of the upper limit discriminating comparator is controlled to be higher by the voltage Vu' on the output side of the lower side wave band is connected to the comparator $Ic_{1-3}$ so as to vary the upper and lower detecting limit voltages $Vz_1$ and $Vz_2$ and to make the voltages $Vz'_1$ and $Vz'_2$ as in (h) in FIG. 14 to eliminate the mis-operation.

The values of the capacitors $C_1$ and $C_2$ in the first and second detection integrating circuits 17 and 18 are so selected that, in case the signal is present only in the upper side wave band or lower side wave band, the capacitor will be saturated and the voltages $Vz'_1$ and $Vz'_2$ will not vary more than is fixed to prevent any unfavorable influences.

As described above, according to the present invention, not only when the Doppler component is present only in the one side side wave band but also when the Doppler component is present in an irregular form in each of both side wave bands as in the case of bell sounds, no mis-operation will be caused.

Further, as shown in FIG. 2, in the first and second quadrature detecting circuits 8 and 9, the "Q" outputs of the cascade-connected D type flip-flop circuits $Ic_{4-1}$ and $Ic_{4-2}$ and the inputs of the respective quadrature detecting circuits are connected respectively with each other through the diodes $D_1$ and $D_2$ so as to obtain quadrature detecting circuits high in the reliability even without using such conventional complicated and costly circuit as is shown in FIG. 15. Further, the D type flip-flop circuit is inexpensive as also using a frequency dividing circuit.

In the phase difference detecting circuits 14 and 15, as shown in FIG. 2, the outputs of the wave form shaping circuits 12 and 13 are connected respectively to the differentiating circuit 14' comprising the capacitor $C_2$ and resistance Rx and the differentiating circuit 15' comprising the capacitor Cy and resistance Ry and are connected to the differentiating circuits of the others through the diodes Dx and Dy, therefore, differentiated detection signals will be given respectively to the output end of the second phase difference detecting circuit 15 when the input signal to the first phase difference detecting circuit 14 is advanced in the phase and to the output end of the first phase difference detecting circuit 14 when the input signal to the second phase difference detecting circuit 15 is advanced in the phase and the phase difference detecting circuits are simplified.

In the in-phase component removing circuit 19 and D/A converting circuit 20, as shown in FIG. 2, the resistances $r_o$ are connected in series through the diodes $Dz_1$ and $Dz_2$ arranged to be of the same polarity between two sets of digital output terminals, the first integrating circuit consisting of the capacitor Ca and the second integrating circuit consisting of the capacitor Cb and resistance $R_3$ are connected to the intermediate point of both resistances $r_o$, whereby the removal of the in-phase component is made possible, an analogue output corresponding to the input state of the digital signal is obtained, the input states of two sets of digital signals can be discriminated only by judging whether the analogue output is higher than, the same as or lower than the reference voltage or varies to be above or below it, so that the formations can be made simple. Further, as the limit detecting voltage of the upper and lower limit discriminating circuit is made to be controlled by the detection integrating circuit, for example, even in case the Doppler frequency wave component is generated irregularly as in FIG. 8A, the mis-operation will be able to be prevented from occurring.

In such conventional detecting device as is shown in FIG. 16, the phase difference detecting circuit is formed so that, by sampling whether one of the quadrature detecting output is plus or minus with respect to the other quadrature detecting output as the standard, said one of the outputs will be D/A converted. In such wave signal including the Doppler frequency wave component as in FIGS. 8A and 8B of such as the bell sounds, the in-phase component cannot be removed and the compensation when the upper and lower side wave band components are generated at random cannot be made.

Further, there has been a defect that, in case both the quadrature detecting outputs are close to be in-phase, if the quadrature detecting output to be sampled is close to a sine curve as shown in FIGS. 7A and 7B, there will be no problem but, if there is an excess signal due to the bell sounds or the like as shown in FIG. 7B, the quadrature detecting output will be saturated to be close to a square wave and there will be the same signal output as in the case that there is a moving object.

Further, there has been a defect that, in the conventional phase difference detecting circuit, as one of the quadrature detecting output is given from one terminal by sampling the output with respect to the other quadrature detecting output as the standard, the voltage will be made zero in case there is no target object in the output voltage of this phase difference detecting circuit and, with this zero voltage as the standard, two current sources will be required to obtain a plus or minus voltage.

According to the present invention, the outputs of the phase difference detecting circuits are divided to be of the case that the target object approaches and the case that it leaves away, the respective output signals are provided out by the zero or plus signals, these two sets of outputs are distinguished by the in-phase component removing circuit, the target object is discriminated with the ½ Vcc voltage as the standard when the object is present in the D/A converting circuit in the later step as plus to ½ Vcc in case the object approaches and as minus from ½ Vcc in case it leaves away, so that it will be sufficient to use only one current source and the circuit formation can be simplified.

What is claimed is:

1. An ultrasonic type motion detector, wherein an ultrasonic wave is generated by a transmitting element driven with an output signal of an oscillating circuit which is frequency-divided by a frequency dividing circuit, an output signal of an element for receiving said generated ultrasonic wave is amplified by an amplifying circuit, the frequencies of the transmitted wave signal and the received wave signal are detected by a detecting section comprising a quadrature detecting circuit and phase difference detecting circuit for producing a pair of output signals, one of the pair of output signals only is inverted and combined with the other output signal to provide a standard voltage source, the respective output signals of the detecting section are each integrated in an integrating circuit to produce first and second threshold voltage signals which are respectively fed to a pair of comparators which are connected in parallel with each other and which have the output voltage signal of the standard voltage source connected thereto as input signals, to thereby produce an output signal when the output voltage signal of the standard voltage source does not lie between said first and second threshold voltage levels.

2. A detector according to claim 1 wherein said quadrature detecting circuit includes a diode which is switched with a 90° phase difference signal of said frequency dividing circuit.

3. A detector according to claim 1 wherein said phase difference detecting circuit comprises first and second capacitors respectively differentiating output signals from first and second shaping circuits, and the differentiated output signal of said first capacitor is connected to an output terminal of said second shaping circuit through a first diode while the differentiated output signal of said second capacitor is connected to an output terminal of said first shaping circuit through a second diode.

4. A detector according to claim 1 wherein a pair of said phase difference detecting circuits are provided, the output signal of one of the respective phase difference detecting circuits is inverted and connected to the output signal of the other phase difference detecting circuit through first and second diodes of the same direction and first and second resistances connected in series between said diodes, said diodes and resistances forming an in-phase component removing circuit, and wherein first and second integrating circuits are sequentially connected to an intermediate position of said resistances, and an output terminal of said second integrating circuit is connected to one of said comparators.

* * * * *